US 6,549,690 B2

(12) United States Patent
Schulte et al.

(10) Patent No.: US 6,549,690 B2
(45) Date of Patent: Apr. 15, 2003

(54) RESISTOR ARRAY WITH POSITION DEPENDENT HEAT DISSIPATION

(75) Inventors: Donald W. Schulte, Corvallis, OR (US); Adam L Ghozeil, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/952,923

(22) Filed: Sep. 14, 2001

(65) Prior Publication Data

US 2002/0015550 A1 Feb. 7, 2002

Related U.S. Application Data

(62) Division of application No. 09/493,950, filed on Jan. 28, 2000, now Pat. No. 6,314,216.

(51) Int. Cl.[7] .............................. G02B 6/26; G02B 6/42
(52) U.S. Cl. .......................... 385/17; 347/62; 347/210; 347/200; 347/206
(58) Field of Search ...................... 347/206, 208–210, 347/62, 40, 15; 385/17

(56) References Cited

U.S. PATENT DOCUMENTS

| 4,769,527 A | * | 9/1988 | Hart et al. .................. 347/210 |
| 4,988,157 A | * | 1/1991 | Jackel et al. |
| 5,357,271 A | * | 10/1994 | Wiklof et al. |
| 5,414,245 A | * | 5/1995 | Hackleman .................. 219/548 |
| 5,699,462 A | | 12/1997 | Fouquet et al. |
| 5,960,131 A | * | 9/1999 | Fouquet et al. |

FOREIGN PATENT DOCUMENTS

| JP | 3290268 | * | 12/1991 |
| JP | 7022547 | * | 1/1995 |

OTHER PUBLICATIONS

C. Schenke, EPO Search Report–EP Application No. 01 30 0343.9–2217 (May 17, 2002).*

* cited by examiner

Primary Examiner—Hemang Sanghavi
Assistant Examiner—Scott A Knauss

(57) ABSTRACT

A thermally actuated fluidic optical switching circuit that includes a heater substructure having heater resistors and thermally conductive regions associated with the heater resistors and configured to tailor the thermal characteristics of the heater substructure.

7 Claims, 3 Drawing Sheets

RESISTOR ARRAY WITH POSITION DEPENDENT HEAT DISSIPATION

CROSS REFERENCE TO RELATED APPLICATION(S)

This is a divisional of application Ser. No. 09/943,950 filed on Jan. 28, 2000 now U.S. Pat. No. 6,314,216, which is hereby incorporated by reference herein.

BACKGROUND OF THE INVENTION

The disclosed relates generally to optical switching circuits, and more particularly to optical switching circuits that employ heater resistors to control the states of optical switching elements.

Optical fibers are replacing conductive wires in telephone and data communications, since optical fibers provide extremely high bandwidth, are immune to radio frequency noise, and generate virtually no electromagnetic interference. As the cost of optical fibers decreases, use of optical fibers is expanding to applications that require switching to dynamically reconfigure the interconnection of optical signal paths.

A known approach to optical switching involves thermally controlling the presence or absence of liquid in a gap at which a plurality of optical waveguide segments intersect. This approach can be implemented for example in an optical switching circuit that includes a waveguide substrate having a plurality of thermally actuated fluidic optical switches, and a heater substrate disposed adjacent the waveguide substrate. The heater substrate includes an array of heater resistors that selectively thermally actuate the optical switches, for example by forming drive bubbles to move fluid to move into and out of gaps in the waveguide substrate that transmit or reflect light as a function of the presence or absence of fluid.

A consideration with the foregoing fluidic optical switching circuit is the non-uniform thermal characteristics of heater resistors in the heater substrate. For example, resistors closer to the middle of the heater substrate have less heat capacity than resistors closer to the edges of the heater substrate. The non-uniform thermal characteristics may degrade performance, and may also lead to reliability issues for the resistors located near the center of the heater substrate.

There is accordingly a need for an optical switching circuit heater resistor array having localized heat dissipation characteristics that are individually adjustable.

SUMMARY OF THE INVENTION

The disclosed invention is directed to a heater resistor array that includes a thin film integrated circuit substructure, a plurality of heater resistors defined in the thin film sub-structure, and a plurality of thermally conductive regions defined in the thin film sub-structure and dielectrically separated from said heater resistors, each of the thermally conductive regions being located proximately to an associated one of the heater resistors for dissipating heat from the associated heater resistor, wherein each of the thermally conductive regions has an area that is selected to adjust or tailor the heat dissipation capacity of the associated heater resistor. In a particular embodiment of the invention, the heater resistors are planar heater resistors while the thermally conductive regions are planar metal regions.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
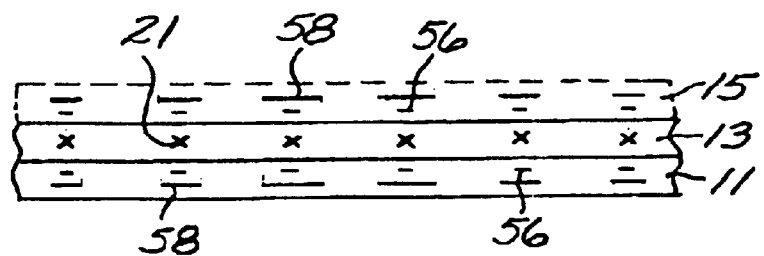
FIG. 1 is a schematic elevational view illustrating a thermally actuated fluid optical switching circuit in which the invention can be employed.

In the following detailed description and in the several figures of the drawing, like elements are identified with like reference numerals.

Referring now to FIG. 1, set forth therein is a schematic elevational block diagram of a thermally actuated fluidic optical switching circuit in which the invention can be employed and which generally includes a waveguide substrate 13 having a plurality of thermally actuated fluidic optical switches 21, and an integrated circuit or thin film heater substructure or die 11 disposed adjacent one side of the waveguide substrate. The thin film heater substructure or die 11 includes heater resistors 56 defined therein for thermally actuating the fluidic optical switches in the waveguide substrate 13, and generally comprises a substrate such as silicon and thin film layers formed thereon. The thermally actuated fluidic optical switching circuit of FIG. 1 can also include a further thin film heater substructure 15 (shown in broken lines) on the other side the waveguide substrate 11. Examples of thermally actuated fluidic optical switching circuits in which the invention can be incorporated are disclosed in U.S. Pat. No. 5,699,462, Fouqet et al., incorporated herein by reference.

Figure 2:
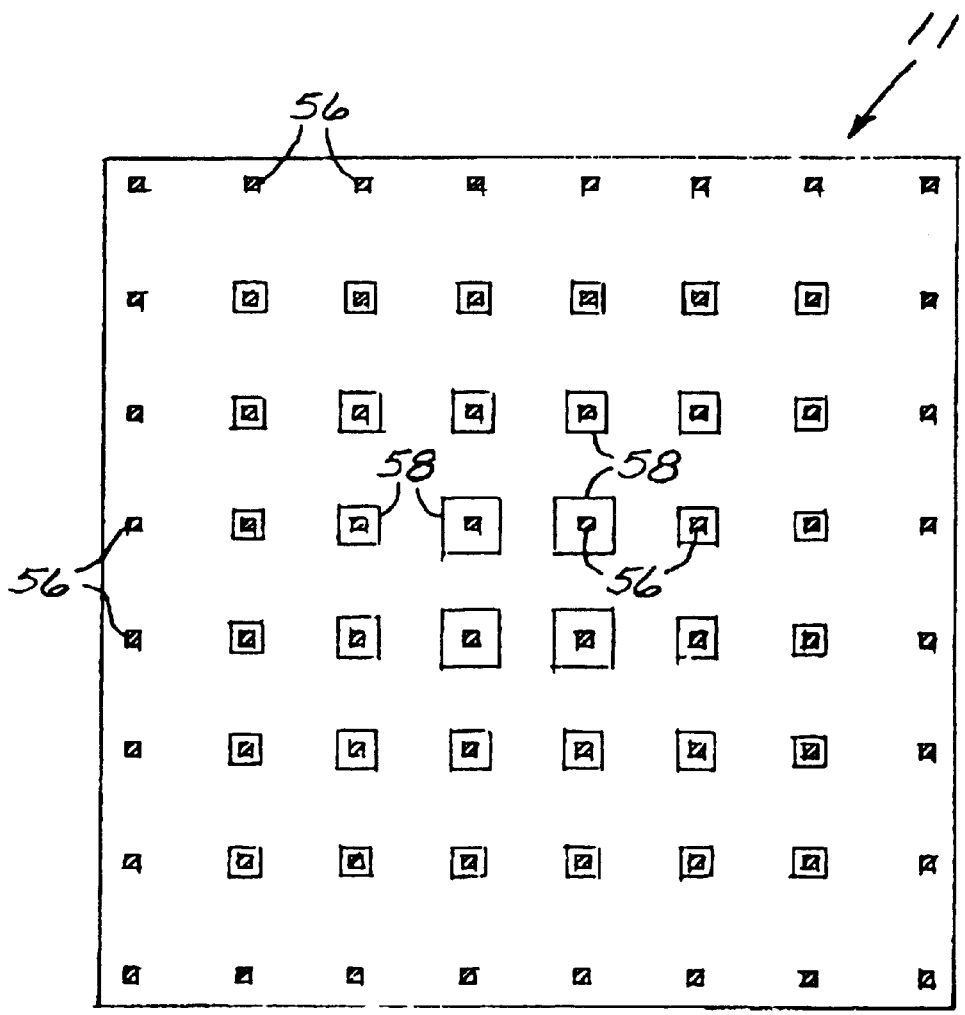
FIG. 2 is a schematic top plan view illustrating a heater resistor array of the optical switching circuit of FIG. 1.

Referring now to FIG. 2, schematically set forth therein is a top plan view of the thin film heater substructure 11 that illustrates a heater resistor structure array in accordance with the invention. The thin film heater substructure 11 includes a plurality of resistors 56, and a plurality of thermally conductive regions 58 respectively associated with and underlying the heater resistors 56 for dissipating heat from the associated heater resistors 56. By way of illustrative example, as described further herein, the heater resistors 56 comprise thin film resistors, while the thermally conductive regions comprise metal regions or slabs. In FIG. 2 the thermally conductive regions associated with heater resistors close to the edges of the thin film heater substructure are not shown so as to indicate that such thermally conductive regions do not extend laterally beyond their associated heater resistors.

The thermally conductive regions thermally couple the heater resistors to the substrate of the thin film heater sub-structure 11, and in accordance with the invention, each of the thermally conductive heat dissipating regions 58 is individually configured to tailor or adjust the heat dissipating capacity of the particular heater resistor structure formed by a particular heater resistor and an associated thermally conductive region, for example to configure the thermal profile of the thin film heater substructure 11. In particular, the heat dissipating capacity of a thermally conductive region increases as the area thereof increases, and the heat capacity of a heater resistor structure is adjusted by adjusting the area of the thermally conductive region of the particular heater resistor structure.

By way of a specific example wherein mounting and sealing structures are attached to edges of the thin film heater substructure, thermally conductive regions 58 in the middle portion of the thin film heater substructure 11 can be configured to have greater areas than thermally conductive regions 58 near the edges of the thin film heater substructure 11, for example, so as to provide tor a more uniform thermal characteristic across the thin film heater substructure 11. This occurs since the heater resistors near the edges of a thin film heater substructure 11 having mounting and sealing structures attached to its edges would have greater heat dissipation capacities due to closer proximity to the mounting and sealing structures, while heater resistors in the middle of the thin film heater substructure would have less heat capacity due to the relatively poor thermal conductivity of the dielectric layers of the thin film heater substructure.

By way of another example wherein a mounting structure is attached to the middle portion of the thin film heater substructure 11, the thermally conductive regions 58 near the edges of the thin film heater substructure 11 can be configured to have greater areas than thermally conductive regions 58 in the middle portion of the thin film heater substructure 11, for example, so as to provide for a more uniform thermal characteristic across the thin film substructure 11.

In general, it should be appreciated that the thermal dissipation characteristics, pattern, or profile of the thin film heater substructure 11 is tuned by varying or selecting the areas of the thermally conductive regions as a function of location in the thin film sub-structure.

The thin film heater substructure 11 can be made pursuant to standard thin film integrated circuit processing including chemical vapor deposition, photoresist deposition, masking, developing, and etching, for example as disclosed in commonly assigned U.S. Pat. No. 4,719,477 and U.S. Pat. No. 5,317,346, incorporated herein by reference.

Figure 3:
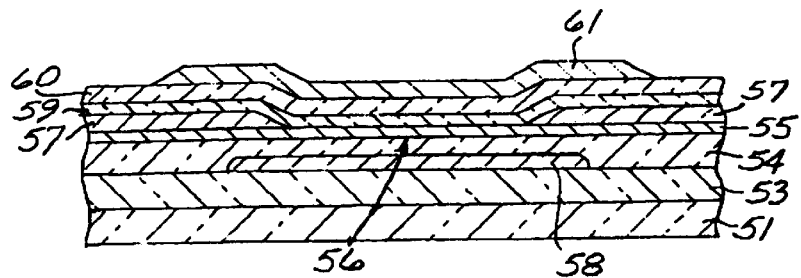
FIG. 3 is an unscaled schematic cross sectional view of an example of a heater substructure of the circuit of FIG. 1 taken laterally through a representative heater resistor region.

Referring now to FIG. 3, set forth therein is an unscaled schematic cross sectional view of a particular implementation of the heater substructure 11 taken through a representative heater resistor 56. The thin film heater substructure 11 more particularly includes a silicon substrate 51, a thermally grown silicon dioxide layer 53 disposed over the silicon substrate 51, and a patterned metallization layer including metal subareas or slabs 58 disposed on the thermal oxide layer 53. A deposited silicon dioxide layer 54 is disposed over the first metallization layer that includes the metal sub-areas 58, while a resistive layer 55 comprising for example tantalum aluminum is formed on the deposited oxide layer 54. A patterned metallization layer 57 comprising aluminum doped with a small percentage of copper and/or silicon, for example, is disposed over the resistive layer 55.

The metallization layer 57 comprises metallization traces defined by appropriate masking and etching. The masking and etch of the metallization layer 57 also defines the resistor areas. In particular, the resistive layer 55 and the metallization layer 57 are generally in registration with each other, except that portions of traces of the metallization layer 57 are removed in those areas where heater resistors are formed. In this manner, the conductive path at an opening in a trace in the metallization layer 57 includes a portion of the resistive layer 55 located at the opening or gap in the conductive trace. Stated another way, a resistor area is defined by providing first and second metallic traces that terminate at different locations on the perimeter of the resistor area. The first and second traces comprise the terminal or leads of the resistor which effectively include a portion of the resistive layer that is between the terminations of the first and second traces. Pursuant to this technique of forming resistors, the resistive layer 55 and the metallization layer can be simultaneously etched to form patterned layers in registration with each other. Then, openings are etched in the metallization layer 57 to define resistors. The heater resistors 56 are thus particularly formed in the resistive layer 55 pursuant to gaps in traces in the metallization layer 57.

The metal subareas 58 underlie and are proximate to associated heater resistors 56, and comprise heat dissipating thermally conductive regions. In accordance with the invention, the areas of the metal subareas, which are generally planar, are individually configured to achieve a desired heat dissipation capacity for the laminar heater resistor structure formed by the heater resistor and the associated metal subarea. This allows for tailoring of the thermal characteristic of the thin film heater substructure 11.

A composite passivation layer comprising a layer 59 of silicon nitride ($Si_3N_4$) and a layer 60 of silicon carbide (SiC) is disposed over the metallization layer 57, the exposed portions of the resistive layer 55, and exposed portions of the oxide layer 53. Optionally, a tantalum passivation layer that includes tantalum subareas 61 can be disposed on the composite passivation layer 59, 60 over the heater resistors 56, for example to provide for mechanical passivation that absorbs cavitation pressure of collapsing drive bubbles produced in the fluid in the waveguide substrate 13 pursuant to selective energizing of the heater resistors.

Figure 4:
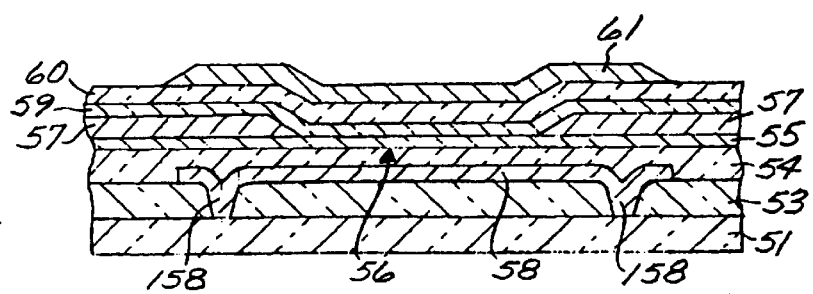
FIG. 4 is an unscaled schematic cross sectional view of a further example of a heater substructure of the circuit of FIG. 1 taken laterally through a representative heater resistor region.
Figure 5:
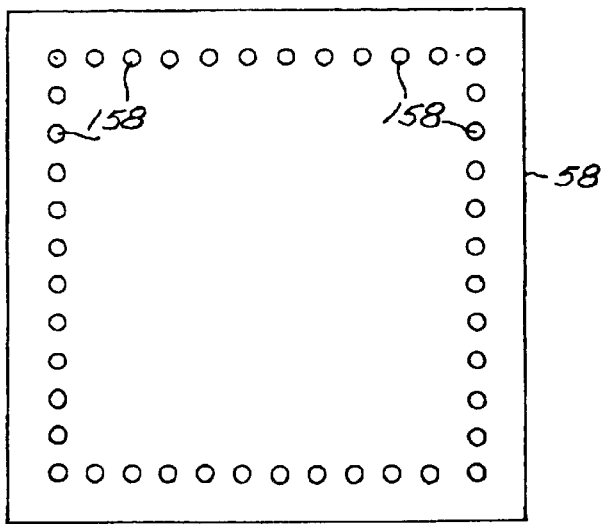
FIG. 5 is a top plan view illustrating a via structure of the heater substructure of FIG. 4.
Figure 6:
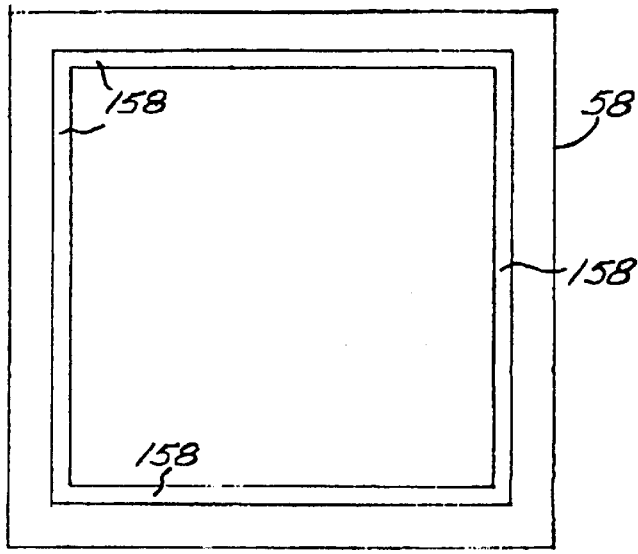
FIG. 6 is a top plan view illustrating another via structure of the heater substructure of FIG. 4.

Referring now to FIG. 4, schematically set forth therein is a schematic cross sectional view of a further implementation of the heater substructure 11 taken through a representative heater resistor 56. The heater substructure 11 of FIG. 4 is similar to the heater substructure 11 of FIG. 3 and includes metal slabs 58 that are electrically contacted to the silicon substrate 51 by vias 158. The vias 158 can comprise cylindrical vias as illustrated in FIG. 5, or line vias as illustrated in FIG. 6. The vias 158 are formed for example by etching via openings in thermal oxide layer 53 prior to deposition of the first metallization layer in which the slabs 58 are formed. In accordance with the invention, the area of each of the metal slabs 58 is individually configured to define a desired thermal dissipation capacity for the particular heater resistor structure.

Figure 7:
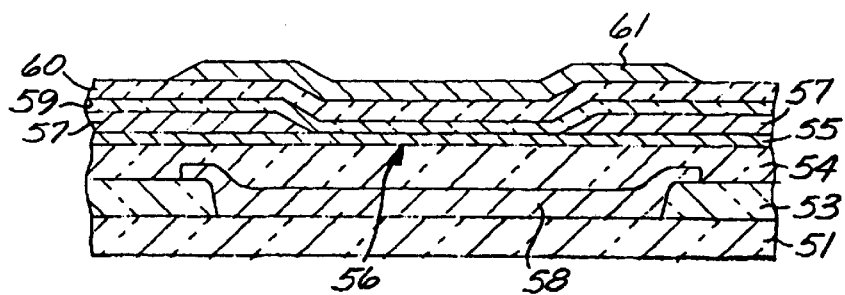
FIG. 7 is an unscaled schematic cross sectional view of another example of a heater substructure of the circuit of FIG. 1 taken laterally through a representative heater resistor region.

Referring now to FIG. 7, schematically set forth therein is a schematic cross sectional view of another implementation of the heater substructure 11 taken through a representative heater resistor 56. The heater substructure 11 of FIG. 7 is similar to the heater substructure 11 of FIG. 3 and includes metal slabs 58 that are disposed on the silicon substrate 51 and thereby electrically contacted to the silicon substrate 51. The metal slabs 58 are basically large contacts, and are formed for example by etching suitable openings in thermal oxide layer 53 prior to deposition of the first metallization layer in which the metal slabs 58 are formed. In accordance with the invention, the area of each of the metal slabs 58 is individually selected to define a desired thermal dissipation capacity for the particular heater resistor structure.

It should be appreciated that the thin film heater substructure 11 can include active devices, in which case additional layers would be formed between the formation of the thermal oxide layer 53 and formation of the metallization layer that includes the metal slabs 58. For example, poly silicon would be deposited and patterned on the thermal oxide layer, and a doped oxide layer would be deposited, densified and reflowed. The first metallization layer would then be deposited and patterned.

The foregoing has thus been a disclosure of a heater sub-structure that is useful for optical switching circuits and which advantageously includes heater resistors having individually tailored heat dissipation characteristics.

Although the foregoing has been a description and illustration of specific embodiments of the invention, various modifications and changes thereto can be made by persons skilled in the art without departing from the scope and spirit of the invention as defined by the following claims.

What is claimed is:

1. A heater resistor array comprising:
   a thin film substructure;
   a plurality of thin film heater resistors formed in said thin film substructure; and
   a plurality of metal regions respectively associated with said heater resistors and dielectrically separated from said heater resistors, each of said metal regions being located proximately to an associated one of said heater resistors for dissipating heat from said associated heater resistor, wherein said metal regions have respective areas that are selected so as to tailor a heat dissipation characteristic of said thin film substructure, and wherein said areas of said metal regions vary depending on location in said thin film substructure.

2. The heater resistor array of claim 1 wherein said thin film substructure includes a silicon substrate.

3. The heater resistor array of claim 2 wherein said metal regions are contacted to said silicon substrate.

4. The heater resistor array of claim 3 further including metal vias for contacting said metal regions to said silicon substrate.

5. The heater resistor array of claim 3 wherein said metal regions comprise metal contact slabs disposed on said silicon substrate.

6. A heater resistor array comprising:
   a substrate;
   a thin film substructure formed on the substrate;
   a plurality of thin film heater resistors formed in said thin film substructure, including middle portion resistors located in a middle portion of the substrate and edge portion resistors located near an edge of the substrate, said middle portion resistors having less heat capacity than said edge portion resistors;
   a plurality of metal regions respectively associated with said heater resistors and dielectrically separated from said heater resistors, each of said metal regions being located proximately to an associated one of said heater resistors for dissipating heat from said associated heater resistor, wherein said metal regions have respective areas that vary depending on location in said thin film substrate and are selected so as to tailor a heat dissipation characteristic of said thin film substructure, and wherein metal regions associated with said middle portion resistors have areas which are larger than areas of metal regions associated with said edge portion resistors.

7. A heater resistor array comprising:
   a substrate;
   a thin film substructure formed on the substrate;
   a plurality of thin film heater resistors formed in said thin film substructure, including middle portion resistors located in a middle portion of the substrate and edge portion resistors located near an edge of the substrate, said edge portion resistors having less heat capacity than said middle portion resistors;
   a plurality of metal regions respectively associated with said heater resistors and dielectrically separated from said heater resistors, each of said metal regions being located proximately to an associated one of said heater resistors for dissipating heat from said associated one fo said heater metal regions have respective areas that vary depending on location in said thin film substrate and are selected so as to tailor a heat dissipation characteristic of said thin film substructure, and wherein metal regions associated with said edge portion resistors have areas which are larger than areas of metal regions associated with said middle portion resistors.

* * * * *